United States Patent
Li et al.

(10) Patent No.: US 10,470,368 B2
(45) Date of Patent: Nov. 12, 2019

(54) MULTI-FUNCTIONAL GARDEN IMPLEMENT

(71) Applicants: Weijun Li, Taizhou (CN); Genfa Mao, Taizhou (CN); Shijun Zhu, Taizhou (CN)

(72) Inventors: Weijun Li, Taizhou (CN); Genfa Mao, Taizhou (CN); Shijun Zhu, Taizhou (CN)

(73) Assignee: Wenling Jennfeng Industry Inc., Taizhou (CN)

( * ) Notice: Subject to any disclaimer, the term of this patent is extended or adjusted under 35 U.S.C. 154(b) by 771 days.

(21) Appl. No.: 15/168,109

(22) Filed: May 30, 2016

(65) Prior Publication Data
US 2017/0223893 A1 Aug. 10, 2017

(30) Foreign Application Priority Data

Feb. 4, 2016 (CN) .......................... 2016 1 0079305

(51) Int. Cl.
*A01D 42/04* (2006.01)
*A01D 34/84* (2006.01)
*A01B 51/00* (2006.01)

(52) U.S. Cl.
CPC .............. *A01D 42/04* (2013.01); *A01B 51/00* (2013.01); *A01D 34/84* (2013.01)

(58) Field of Classification Search
CPC ...... A01D 42/04; A01D 34/84; A01B 33/028; A01B 51/00
See application file for complete search history.

(56) References Cited

U.S. PATENT DOCUMENTS

| 2,608,043 A | * | 8/1952 | Berdan | A01D 34/84 172/14 |
| 2,613,582 A |  | 10/1952 | Harshberger |  |
| 2,632,990 A | * | 3/1953 | Stricklen et al. | A01D 34/84 56/16.9 |
| 2,770,088 A | * | 11/1956 | McNamara | A01D 43/063 56/200 |

(Continued)

FOREIGN PATENT DOCUMENTS

CN 201509430 6/2010
JP 2012-239395 12/2012

*Primary Examiner* — Thomas B Will
*Assistant Examiner* — Joel F. Mitchell
(74) *Attorney, Agent, or Firm* — Minder Law Group; Willy H. Wong

(57) ABSTRACT

A multi-functional garden implement comprises an underframe connected with a supporting shaft. A pushing handle is fixedly connected to the underframe, and wheels are connected with the supporting shaft. The multi-functional garden implement further comprises a rotating bracket, which is connected to a power source. A working head is connected to the power source. The rotating bracket is rotatably connected to the underframe and capable of driving the working head to swing to both sides back and forth. Between the underframe and the rotating bracket, there is also a locating mechanism which can secure the rotating bracket onto the underframe. The multi-functional garden implement is capable of adjusting the position of the working head, so as to meet various requirements for the working conditions of gardening work.

13 Claims, 8 Drawing Sheets

(56) References Cited

U.S. PATENT DOCUMENTS

| | | | |
|---|---|---|---|
| 2,909,021 A * | 10/1959 | McLane | A01B 63/163 |
| | | | 56/16.9 |
| 4,257,213 A | 3/1981 | Brumat | |
| 4,840,020 A | 6/1989 | Oka | |
| 4,869,056 A | 9/1989 | Lynch | |
| 4,873,818 A | 10/1989 | Turner | |
| 4,936,886 A * | 6/1990 | Quillen | A01D 34/4167 |
| | | | 172/14 |
| 4,949,534 A | 8/1990 | Evans | |
| 5,423,565 A | 6/1995 | Smith | |
| 5,577,374 A | 11/1996 | Huston | |
| 6,345,489 B1 * | 2/2002 | Everts et al. | A01B 51/02 |
| | | | 172/245 |
| 6,938,699 B2 * | 9/2005 | Templeton et al. | A01D 34/64 |
| | | | 172/13 |
| 6,959,528 B1 | 11/2005 | Scordilis | |
| 7,975,459 B1 | 7/2011 | Murawski | |
| 2005/0000202 A1 | 1/2005 | Scordilis | |
| 2006/0016632 A1 | 1/2006 | Samejima et al. | |
| 2008/0216459 A1 | 9/2008 | Spitzley | |
| 2010/0223897 A1 | 9/2010 | Mills | |
| 2014/0338299 A1 | 11/2014 | Lowery | |
| 2015/0201556 A1 | 7/2015 | Ito et al. | |
| 2015/0223398 A1 | 8/2015 | Nelson | |

* cited by examiner

MULTI-FUNCTIONAL GARDEN IMPLEMENT

RELATED APPLICATIONS

This application claims benefit to Chinese Patent Application No. 201610079305.5, filed Feb. 4, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the technical field of garden equipment, and particularly to a multi-functional garden implement.

Related Art

With the development of the constructions in domestic cities, the urban afforestation has become a big industry. The ordinary maintenance relies on garden implements. The garden implements commonly seen in everyday life, such as the lawn mower, the pruning shears, the string trimmer, the edger, the cutting and irrigation machine, and the micro cultivator, are mostly powered by gasoline engines.

One prior art lawn mower comprises a handle connecting seat. A bracket is secured to the handle connecting seat, and wheels are connected to the lower end of the bracket. The handle is connected to the rear end of the handle connecting seat through the handle sleeve, and a handle switch is installed on the rear end of the handle. A gasoline engine is fixed above the bracket, and the gasoline engine connects with the mowing head which is in front of the bracket through the transmitting rod on the transmitting connecting seat. The working head of the lawn mower is located in the middle of the front end. Only by going forward and backward, can the working head cut back and forth. When it is necessary to cut near walled corners and other locations, due to the relation between positions of the two wheels, the working head is hard to access to the corner. Therefore, it has a poor applicability.

SUMMARY OF THE INVENTION

One objective of a preferred embodiment of the present invention is to avoid the issues stated above in the prior art, and to provide a multi-functional garden implement. The present multi-functional garden implement can adjust the position of the working head, so as to meet various requirements for gardening work.

One objective of a preferred embodiment of the present invention can be achieved by the following technical scheme:

A multi-functional garden implement comprises an underframe connected with a supporting shaft. A pushing handle is secured to the underframe and is located at the rear end of the underframe. Wheels are connected to the supporting shaft. It is characterized in that:

The multi-functional garden implement further comprises a rotating bracket, which is connected to a power source. A working head is also connected to the power source, and is located at the front end of the underframe. The rotating bracket is rotatably connected to the underframe and can drive the working head to swing to both sides back and forth. Between the underframe and the rotating bracket, there is also a locating mechanism which can secure the rotating bracket onto the underframe.

The pushing handle is used to manually push the underframe to move. The working head could be a mowing cutter, a trimming cutter or a tilling cutter. The power source is a power motor, and drives the working head to work through a transmitting shaft. The working head is located in the front end of the underframe. During the forward movement of the underframe, it can mow the lawn in the garden, or prune the trees, or till the field. Furthermore, both of the power source and the working head are installed on the rotating bracket, and the rotating bracket can rotate relative to the underframe. Namely, the working head can face forward, or swerves to one side by rotating the rotating bracket and then gets fixed by the locating mechanism. The swerved working head can mow or till the field of the garden during the forward movement of the underframe, so as to meet the requirements for various working conditions, and achieve a better applicability.

In the multi-functional garden implement, a supporting plate is secured to the underframe. The supporting shaft is parallel to the supporting plate. The rotating bracket is plate-shaped. The rotating bracket is rotatably connected to the supporting plate through the rotating shaft, and the axis line of the rotating shaft is perpendicular to that of the supporting shaft. There are two wheels, rotatably connected to the two ends of the supporting shaft respectively. The supporting plate is supported by the wheels, and can tilt and swing in the fore-and-aft direction, so as to adjust the distance between the working head and the ground. The rotating bracket is a rotating plate, and of course, it may be a frame-shaped supporting structure in the practical application. The axis line of the rotating shaft is perpendicular to the rotating bracket and the supporting plate, so when the rotating bracket rotates, the working head swings to the left or right side of the underframe, so as to mow or till the field of the garden at the side of the underframe.

In the multi-functional garden implement, the rotating bracket is parallel to the supporting plate, and there is a clearance between the lower face of the rotating bracket and the upper face of the supporting plate. The clearance can reduce the friction force when the rotating bracket rotates, and makes the rotating bracket rotate more smoothly. Furthermore, in order to increase the rigidity of the rotating bracket and the supporting plate, both parts are made of metal. Hence, the clearance between the two parts also avoids the rust resulting from the direct contact between the lower face of the rotating bracket and the upper face of the supporting plate, which improves the stability and the service life.

In the multi-functional garden implement, the locating mechanism comprises a locating pin, a pulling rope and an operating handle. Multiple locating holes are formed in the upper face of the rotating bracket, and these locating holes are arranged around the rotating shaft. The locating pin is slidably connected to the supporting plate in the vertical direction, and the end of the locating pin is fixed to one end of the pulling rope. The operating handle is hinged to the free end of the pushing handle, and the other end of the pulling rope is fixed to the operating handle. A locating spring which can make the locating pin be located into the locating hole in an inserted mode is further arranged on the supporting plate. When the operating handle is gripped, the pulling rope can be pulled to detach the locating pin from the locating hole. The operating handle adopts a common handle structure that is widely used, such as the break handle for bicycles. By applying the force, the handle is gripped and hence pulls the pulling rope. Then the pulling rope pulls the locating pin to overcome the pressure of the locating spring, to move upward and detach from the locating hole in the rotating bracket. The rotating bracket can rotate, and there are multiple locating holes evenly distributed around the rotating shaft. By locating the locating pin into different locating holes in an inserted mode, the working head can have different orientations. The structure is simple and the operation is convenient.

In the multi-functional garden implement, the rear edge of the supporting plate is bended upward to form a connecting part. A limiting plate is fixedly connected to the connecting part, and a guiding sleeve is vertically installed on the upper face of the limiting plate. The limiting plate is above the supporting plate, and the lower face of the limiting plate is parallel to the upper face of the supporting plate. The rotating bracket extends into the space between the limiting plate and the supporting plate, and the upper face of the rotating bracket touches the lower face of the limiting plate. The locating pin is slidably installed inside the guiding sleeve. The guiding sleeve guides and limits the locating pin. When the lower end of the guiding sleeve is aligned with the locating hole, the locating pin can smoothly insert into the locating hole, under the action of the locating spring. This prevents the locating pin from getting stuck during the movement. The connecting part is connected with the limiting plate as a whole, and makes the limiting plate be above the rotating bracket. Because the weight of the power motor, the transmitting shaft and the working head is fairly heavy, in order to improve the stability of the connection of the rotating shaft, the rear end of the rotating bracket extends between the limiting plate and the supporting plate. This allows the limiting plate to abut against the upper face of the rotating bracket, and thus preventing the rotating bracket from tilting forward relative to the supporting plate, so that the connection between the rotating bracket and the supporting plate becomes more stable.

In the multi-functional garden implement, an annular groove is further formed in the upper end face of the locating pin. The inner circumferential wall of the guiding sleeve is provided with an annular protruding edge in the circumferential direction. The pulling rope is sleeved with the locating spring. One end of the locating spring presses against the interior of the annular groove, and the other end presses against the annular protruding edge. The annular groove locates the locating spring.

In the multi-functional garden implement, the locating mechanism comprises a swinging rod. The swinging rod is hinged to the underframe, and the front end of the swinging rod is above the rotating bracket. A pedal is fixed to the rear end of the swinging rod. Multiple locating holes are formed in the upper face of the rotating bracket. A locating pin is vertically installed on the lower face at the front end of the swinging rod. A locating spring is arranged between the swinging rod and the underframe, which can make the locating pin be located in the locating hole in an inserted mode. This structure adopts a pedaling mode. Namely, by treading on the pedal, the front end of the swinging rod can tilt upward, and then the locating pin detaches from the locating hole. However, by releasing the pedal as the rotating bracket rotates to the designed position, under the action of the locating spring, the front end of the swinging rod swings downward and makes the locating pin be inserted into the locating hole. The operation is convenient. Of course, in this structure, the diameter of the locating hole shall be greater than the outer diameter of the locating pin, so that the locating pin can be inserted into it at a slant.

In the multi-functional garden implement, a connecting seat is fixedly connected to the underframe, and the swinging rod is hinged to the connecting seat through the shaft pin. A guiding column is further fixedly connected to the swinging rod. A guiding hole is further formed in the connecting seat. Both of the guiding column and the guiding hole are located in the rear side of the shaft pin, and the guiding column slidably inserts into the guiding hole. The guiding column is sleeved with the locating spring. One end of the locating spring presses against the connecting seat, and the other end presses against the swinging rod. The swinging rod, the locating spring and other parts are connected to the connecting seat, so a modular production is possible to achieve. Namely, the only thing to do is to install the assembled connecting seat to the underframe, so the production process is simplified. Of course, since it is difficult to control the force when treading on the pedal, the connecting seat can increase the overall connection strength, and improve the stability. Here, the guiding hole is a long bar-shaped hole, and the lengthwise direction is along the fore-and-aft direction of the underframe. The width of the guiding hole is the same as the outer diameter of the guiding column, so the guiding column can move smoothly in the guiding hole when the swinging rod swings. Meanwhile, the inner wall of the guiding hole also guides and limits the guiding column. This prevents the swinging rod from swinging to left or right resulting the fact that the locating pin is difficult to align with the locating hole.

In the multi-functional garden implement, a disk-shaped supporting seat is secured to the supporting plate. A mounting hole is formed in the upper face of the supporting seat. The rotating shaft is fixedly connected to the rotating bracket, and the lower end of the rotating shaft passes through the mounting hole. A bearing is also fixedly connected to the inside of the mounting hole. The supporting seat is fixedly connected to the supporting plate by welding, and is used to connect with the rotating shaft. This improves the connection strength to the rotating shaft. A bearing is connected with the rotating shaft. The inner race of the bearing supports the rotating bracket, so as to form a clearance between the rotating bracket and the supporting plate.

In the multi-functional garden implement, the lower end of the rotating shaft is provided with a bolt. The bolt extends out of the mounting hole downward, and an anchor nut is screwed onto the extending end of the bolt. The rotating shaft is press fitted with the inner race of the bearing. The anchor nut presses against the inner race of the bearing. The lower face of the rotating bracket presses against the upper end face of the bearing. By locking the inner race of the bearing tightly to the rotating bracket through the anchor nut, the outer race of the bearing is fixedly connected to the supporting seat, which achieves the rotary connection between the rotating bracket and the supporting plate. The structure is stable.

Compared to the prior art, the present multi-functional garden implement has the following advantages:
1. The rotating bracket can rotate relative to the underframe. Namely, the working head can face forward, or be swerved to one side by rotating the rotating bracket. The swerved working head can mow or till the field of the garden during the forward movement of the underframe, so as to meet the requirements for various working conditions, and achieve a better applicability.

2. There is a clearance between the rotating bracket and the supporting plate. The clearance can reduce the friction force when the rotating bracket rotates, and makes the rotating bracket rotate more smoothly. Furthermore, the clearance also avoids the rust resulting from the direct contact between the lower face of the rotating bracket and the upper face of the supporting plate, which improves the stability and the service life.

3. Because the weight of the power motor, the transmitting shaft and the working head is fairly heavy, in order to improve the stability of the connection of the rotating shaft, the rear end of the rotating bracket extends between the limiting plate and the supporting plate. This allows the limiting plate to abut against the upper face of the rotating bracket, and thus preventing the rotating bracket from tilting forward relative to the supporting plate, so that the connection between the rotating bracket and the supporting plate becomes more stable.

DETAILED DESCRIPTION OF THE INVENTION

The embodiments of the present invention will be described below and the technical schemes of the invention will be further illustrated in connection with the accompanying figures. However, the present invention shall not be limited to these embodiments.

Embodiment I

Figure 1:
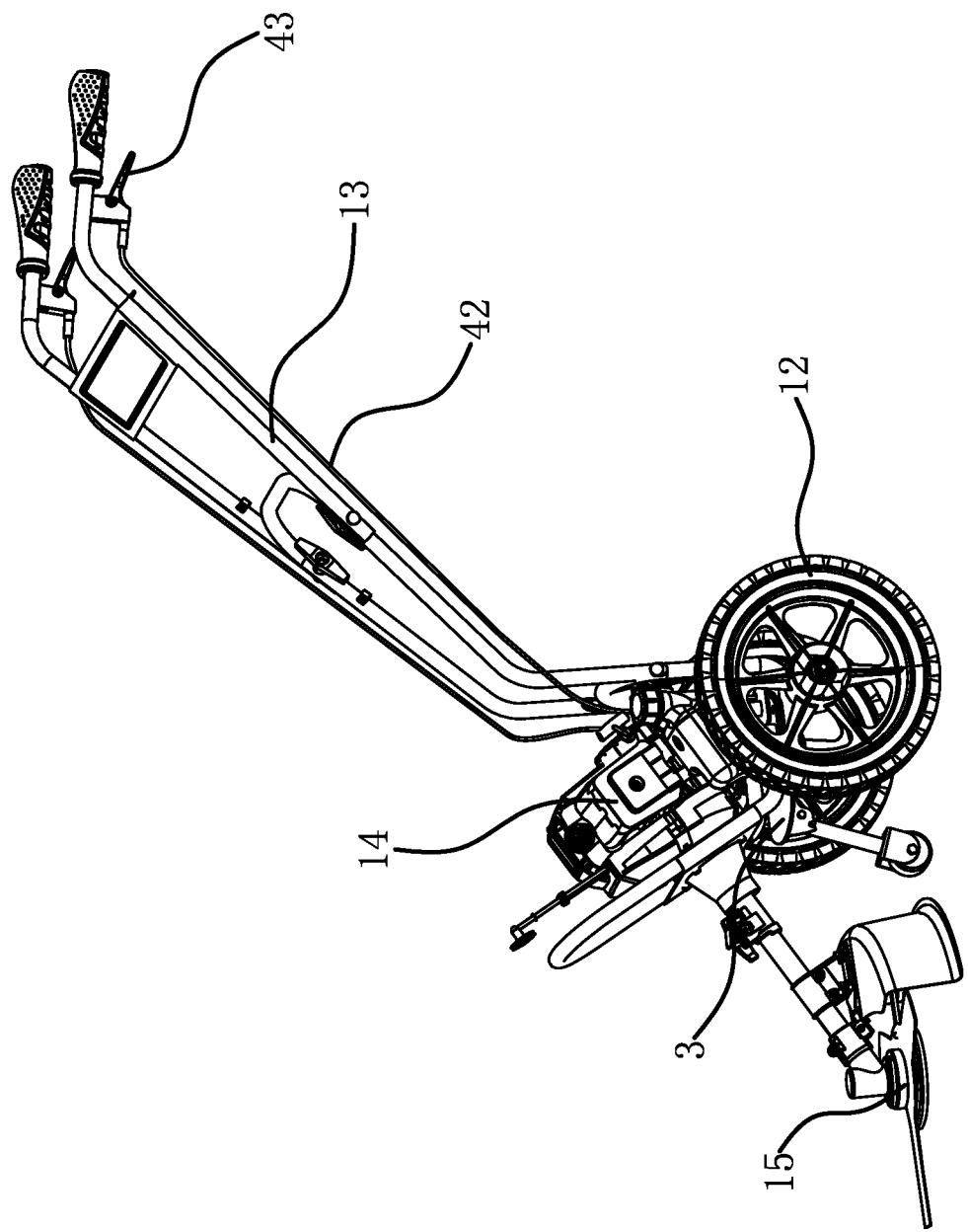
FIG. 1 is a perspective view of a preferred embodiment of the multi-functional garden implement.
Figure 2:
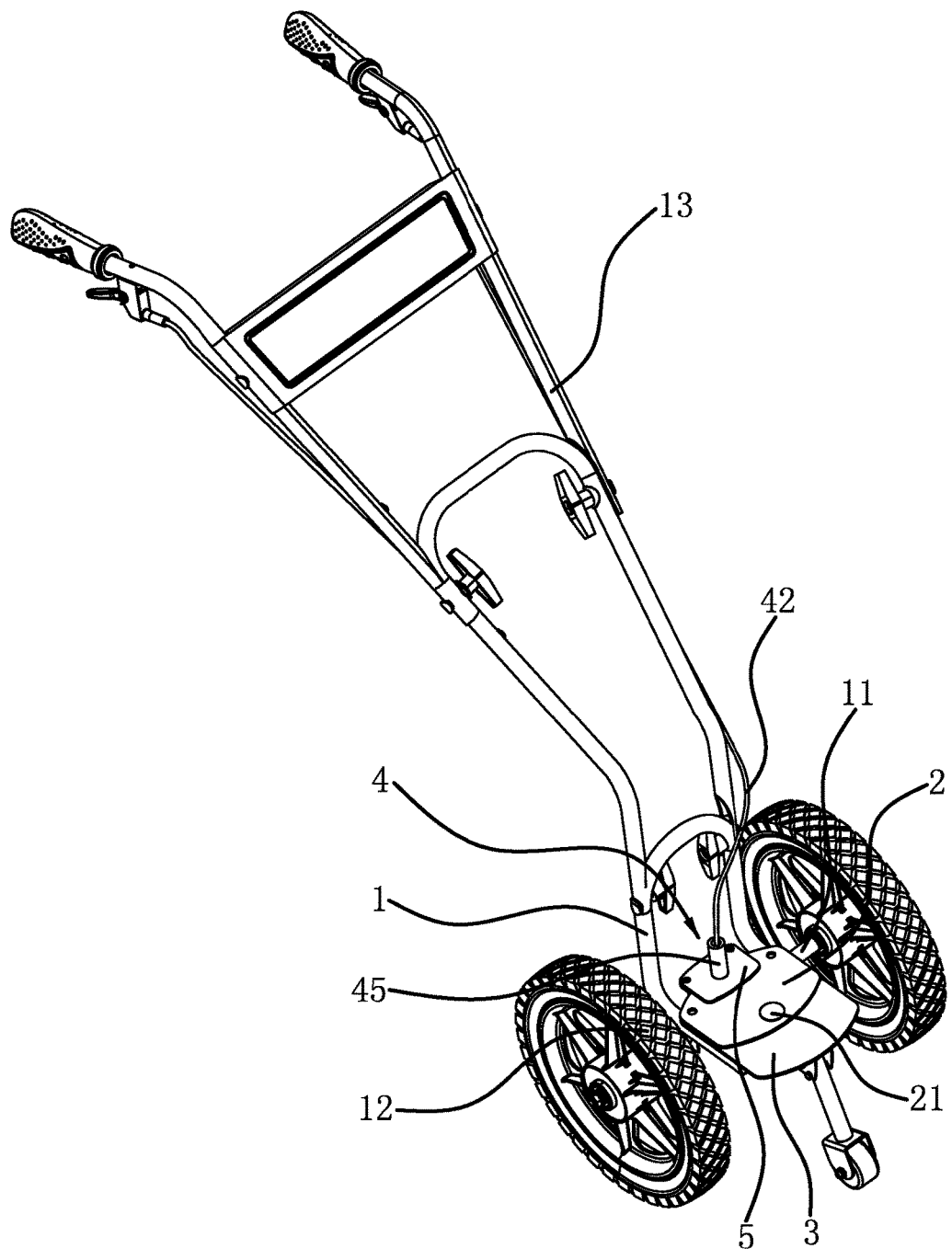
FIG. 2 is a perspective view of a preferred embodiment of the multi-functional garden implement without the power source installed.

As shown in FIG. 1 and FIG. 2, a preferred embodiment of the multi-functional garden implement comprises an underframe (1) and a rotating bracket (2). A supporting shaft (11) is connected to the underframe (1). There are two wheels (12), connected to both ends of the supporting shaft (11) respectively. A pushing handle (13) is fixedly connected to the underframe (1), and the pushing handle (13) is located at the rear end of the underframe (1). A power source (14) is connected to the rotating bracket (2), and a working head (15) is connected to the power source (14). The working head (15) is located at the front end of the underframe (1). The pushing handle (13) is used to manually push the underframe (1) to move. The working head (15) could be a mowing cutter, a trimming cutter or a tilling cutter. The power source (14) adopts a power motor, and drives the working head (15) through a transmitting shaft. The working head (15) is located at the front end of the underframe (1).

During the forward movement of the underframe (1), the working head (15) can mow the lawn in the garden, or trim the trees, or till the field. The rotating bracket (2) is rotatably connected to the underframe (1) and capable of driving the working head (15) to swing to both sides reciprocally. Between the underframe (1) and the rotating bracket (2), there is also a locating mechanism (4) which can secure the rotating bracket (2) onto the underframe (1). The rotating bracket (2) can rotate relative to the underframe (1). Namely, the working head (15) can face forward, or be swerved to one side by rotating the rotating bracket (2) and then gets fixed by the locating mechanism (4). The swerved working head (15) can mow or till the field of the garden during the forward movement of the underframe (1), so as to meet the requirements for various working conditions, and achieve a better applicability.

Figure 3:
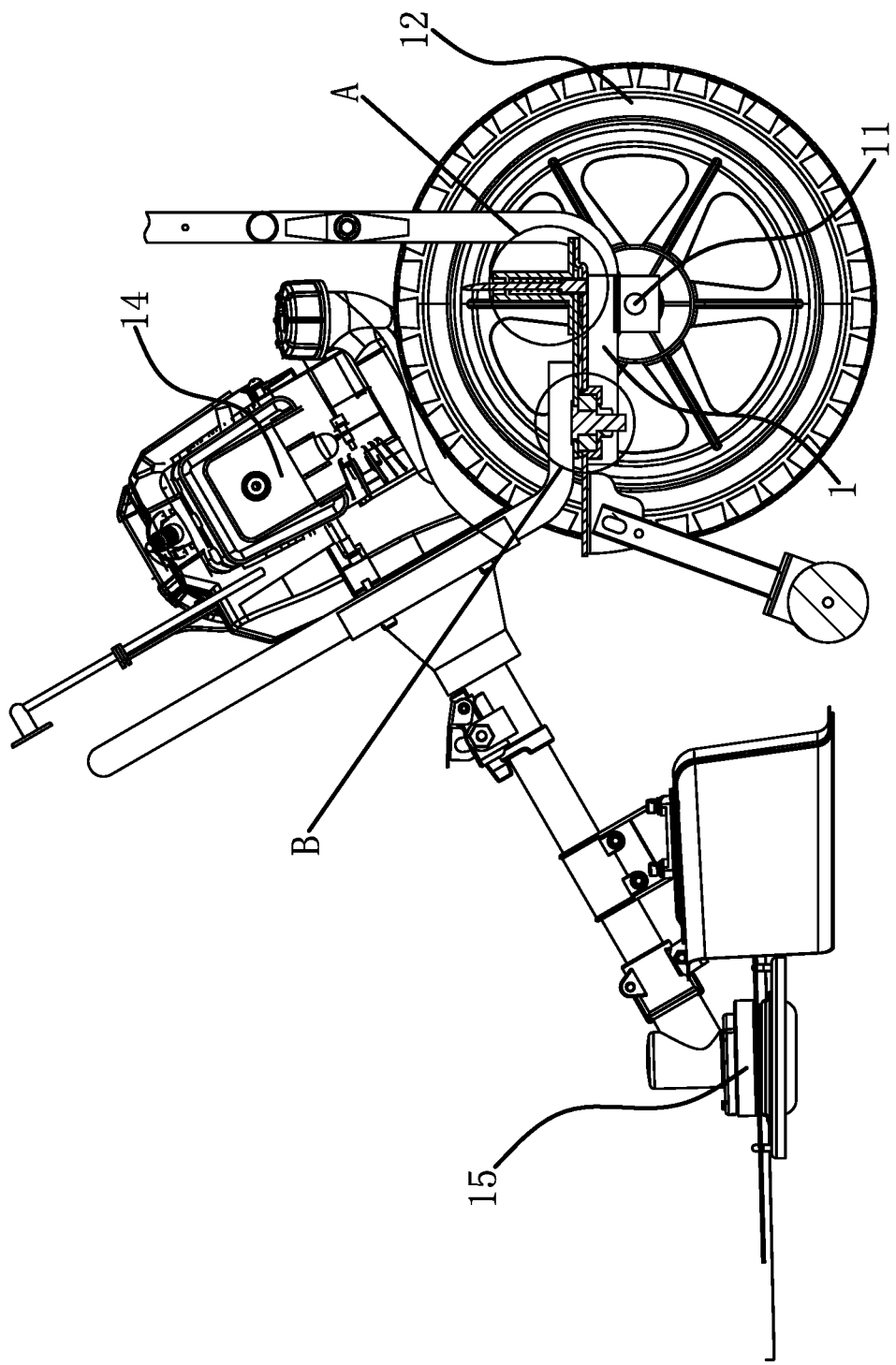
FIG. 3 is a partial sectional view of a preferred embodiment of the multi-functional garden implement.
Figure 4:
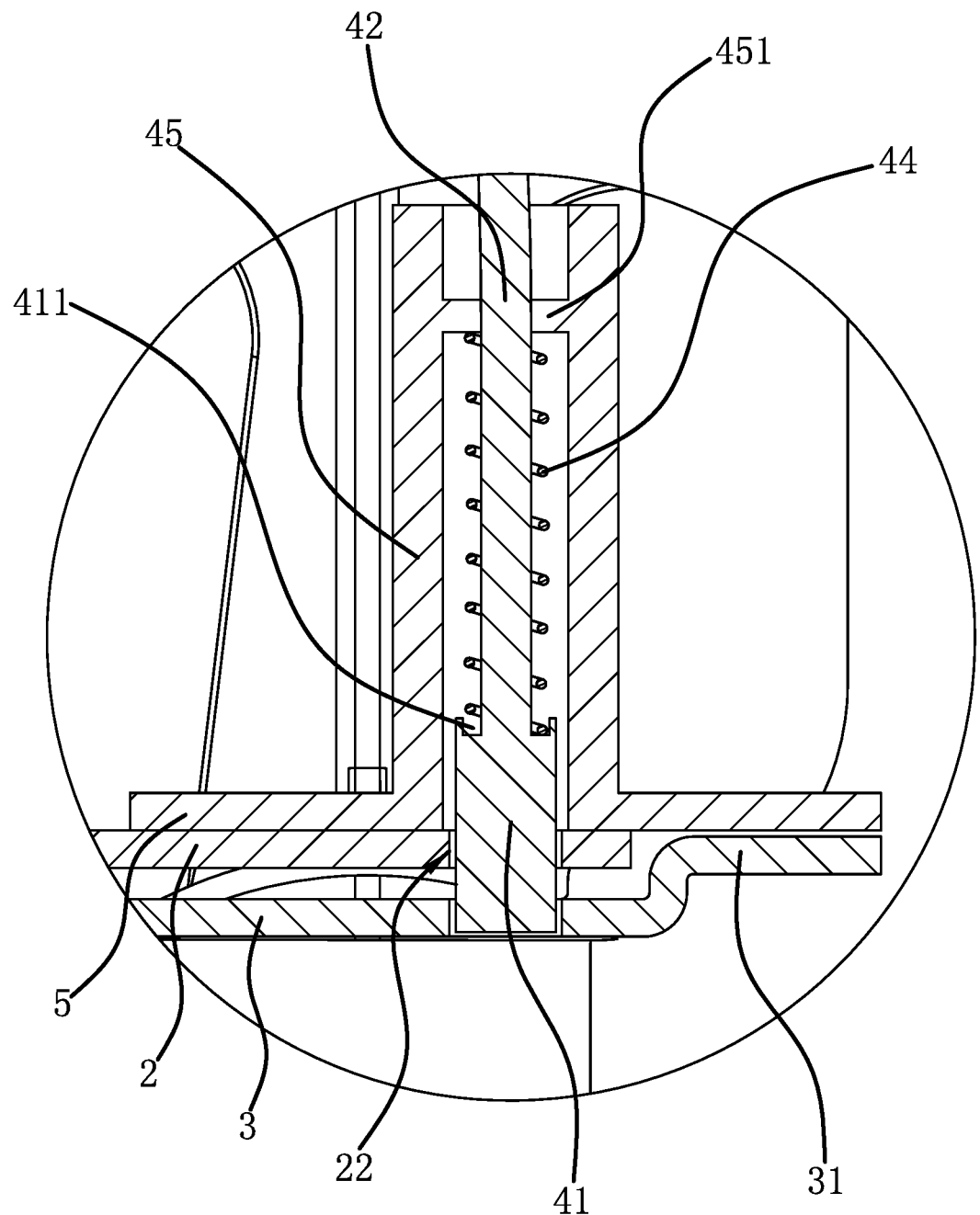
FIG. 4 is an enlarged view of Section A in FIG. 3.
Figure 5:
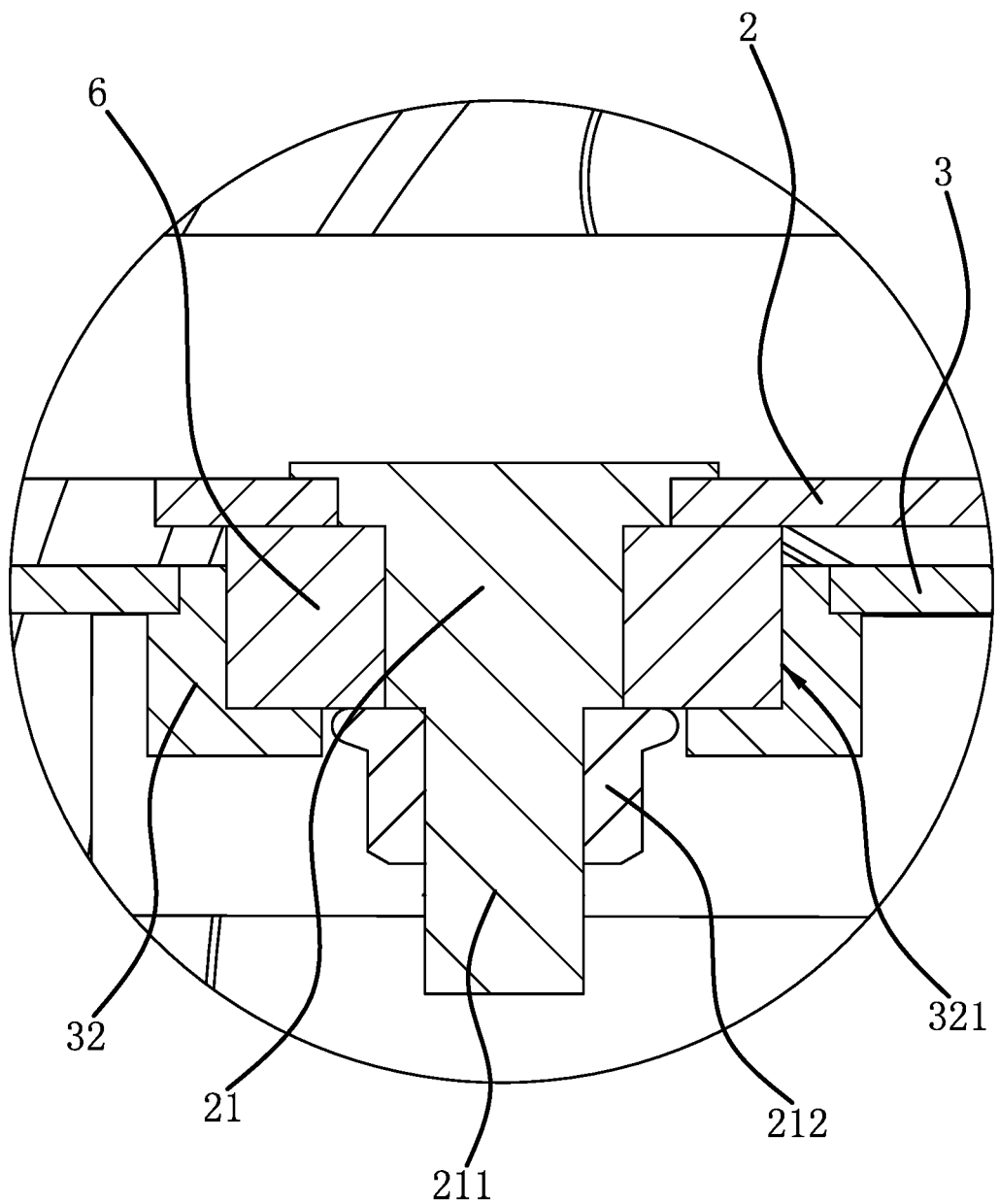
FIG. 5 is an enlarged view of Section B in FIG. 3.

Specifically, as shown in FIG. 3, FIG. 4, and FIG. 5, a supporting plate (3) is secured to the underframe (1). The supporting shaft (11) is parallel to the supporting plate (3). The rotating bracket (2) is plate-shaped. The rotating bracket (2) is rotatably connected to the supporting plate (3) through the rotating shaft (21), and the axis line of the rotating shaft (21) is perpendicular to that of the supporting shaft (11). The supporting plate (3) is supported by the wheels (12), and can tilt and swing in the fore-and-aft direction, so as to adjust the distance between the working head (15) and the ground. The rotating bracket (2) is a rotating plate, and of course it may be a frame-shaped supporting structure in the practical application. The axis line of the rotating shaft (21) is perpendicular to the rotating bracket (2) and the supporting plate (3), so when the rotating bracket (2) rotates, the working head (15) swings to the left or right side of the underframe (1), so as to mow or till the field of the garden at the side of the underframe (1). The rotating bracket (2) is parallel to the supporting plate (3), and there is a clearance between the lower face of the rotating bracket (2) and the upper face of the supporting plate (3). The clearance can reduce the friction force when the rotating bracket (2) rotates, and makes the rotating bracket (2) rotate more smoothly. Furthermore, in order to increase the rigidity of the rotating bracket (2) and the supporting plate (3), both parts are made of metal. Hence, the clearance between the two parts also avoids the rust resulting from the direct contact between the lower face of the rotating bracket (2) and the upper face of the supporting plate (3), which improves the stability and the service life. A disk-shaped supporting seat (32) is fixedly connected to the supporting plate (3). A mounting hole (321) is formed in the upper face of the supporting seat (32). The rotating shaft (21) is fixedly connected to the rotating bracket (2), and the lower end of the rotating shaft (21) passes through the mounting hole (321). A bearing (6) is further fixedly connected to the inside of the mounting hole (321). The supporting seat (32) is fixedly connected to the supporting plate (3) by welding, and is used to connect with the rotating shaft (21). This improves the connection strength to the rotating shaft (21). The lower end of the rotating shaft (21) is provided with a bolt (211). The bolt (211) extends out of the mounting hole (321) downward, and an anchor nut (212) is screwed onto the extending end of the bolt (211). The rotating shaft (21) is press fitted with the inner race of the bearing (6). The anchor nut (212) presses against the inner race of the bearing (6). The lower face of the rotating bracket (2) presses against the upper end face of the bearing (6). By locking the inner face of the bearing (6) tightly to the rotating bracket (2) through the anchor nut (212), the outer race of the bearing (6) is fixedly connected to the supporting seat (32), which achieves the rotary connection between the rotating bracket (2) and the supporting plate (3). The structure is stable.

The locating mechanism (4) comprises a locating pin (41), a pulling rope (42) and an operating handle (43). Multiple locating holes (22) are formed in the upper face of the rotating bracket (2), and these locating holes (22) are arranged around the rotating shaft (21). The locating pin (41) is slidably connected to the supporting plate (3) in the vertical direction, and the end of the locating pin (41) is fixedly connected to one end of the pulling rope (42). The operating handle (43) is hinged to the free end of the pushing handle (13), and the other end of the pulling rope (42) is fixedly connected to the operating handle (43). The supporting plate (3) is further provided with a locating spring (44) which can make the locating pin (41) be located in the locating hole (22) in an inserted mode. When the operating handle (43) is gripped, the pulling rope (42) is pulled to detach the locating pin (41) from the locating hole (22). The operating handle (43) adopts a common handle structure that is widely used, such as the break handle for bicycles. By applying the force, the operating handle (43) is gripped to swing and hence pulls the pulling rope (42). Then the pulling rope (42) pulls the locating pin (41) to overcome the pressure of the locating spring (44), to move upward and detach from the locating hole (22) in the rotating bracket (2). The rotating bracket (2) can rotate, and there are multiple locating holes (22) evenly distributed around the rotating shaft (21). By inserting the locating pin (41) into different locating holes (22), the working head (15) can have different orientations. The structure is simple and the operation is convenient. The rear edge of the supporting plate (3) is bended upward to form a connecting part (31). A limiting plate (5) is fixedly connected to the connecting part (31). The limiting plate (5) is above the supporting plate (3), and the lower face of the limiting plate (5) is parallel to the upper face of the supporting plate (3). The rotating bracket (2) extends into the space between the limiting plate (5) and the supporting plate (3), and the upper face of the rotating bracket (2) touches the lower face of the limiting plate (5). The locating pin (41) is slidably connected to the limiting plate (5). The connecting part (31) is connected with the limiting plate (5) as a whole, and makes the limiting plate (5) be above the rotating bracket (2). Because the weight of the power motor, the transmitting shaft and the working head (15) is fairly heavy, in order to improve the stability of the connection of the rotating shaft (21), the rear end of the rotating bracket (2) extends between the limiting plate (5) and the supporting plate (3). This allows the limiting plate (5) to abut against the upper face of the rotating bracket (2), and thus preventing the rotating bracket (2) from tilting forward relative to the supporting plate (3), so that the connection between the rotating bracket (2) and the supporting plate (3) becomes more stable. At least one through hole is formed in the limiting plate (5). A guiding sleeve (45) is vertically arranged on the upper face of the limiting plate (5), and the guiding sleeve (45) is communicated with the through holes. The locating pin (41) is slidably inserted into the guiding sleeve (45). An annular groove (411) is formed in the upper end face of the locating pin (41). The inner circumferential wall of the guiding sleeve (45) is provided with an annular protruding edge (451) in the circumferential direction. The pulling rope (42) is sleeved with the locating spring (44). One end of the locating spring (44) presses against the interior of the annular groove (411), and the other end presses against the annular protruding edge (451). The guiding sleeve (45) guides and limits the locating pin (41). When the lower end of the guiding sleeve (45) is aligned with the locating hole (22), the locating pin (41) can smoothly be inserted into the locating hole (22), under the action of the locating spring (44). This prevents the locating pin (41) from getting stuck during the movement.

Embodiment II

Figure 6:
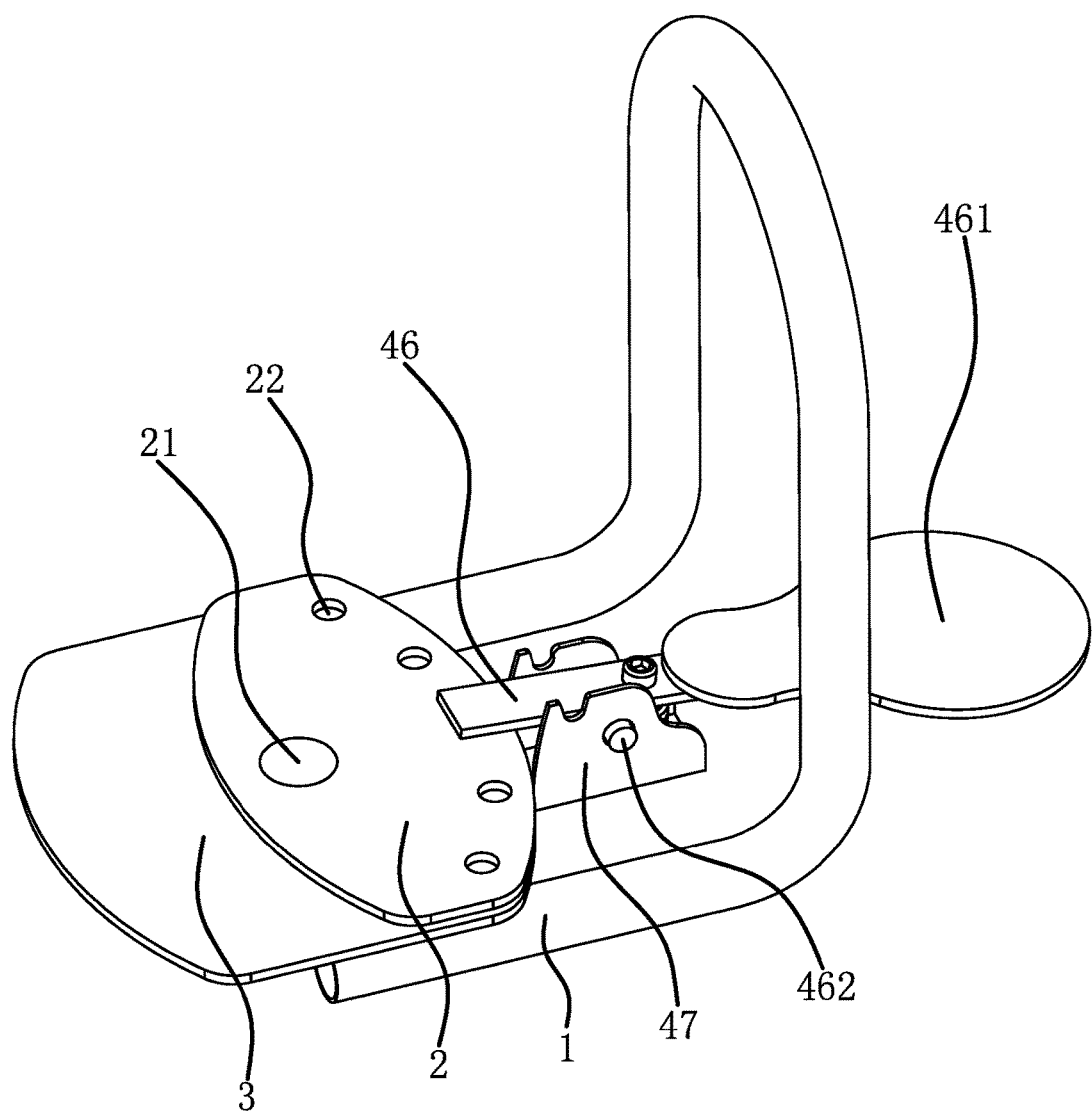
FIG. 6 is a perspective view of the locating mechanism of Embodiment II.
Figure 7:
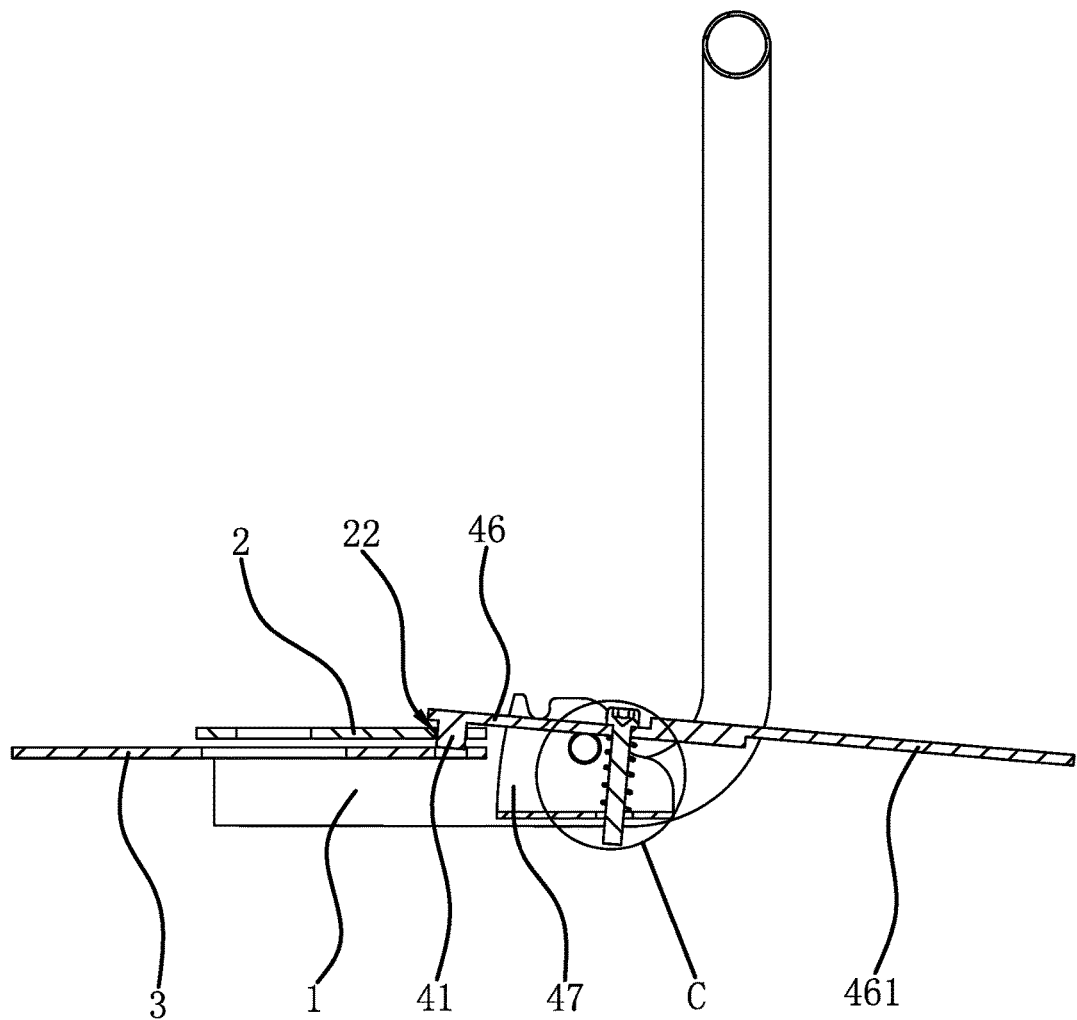
FIG. 7 is a sectional view of the locating mechanism of Embodiment II.
Figure 8:
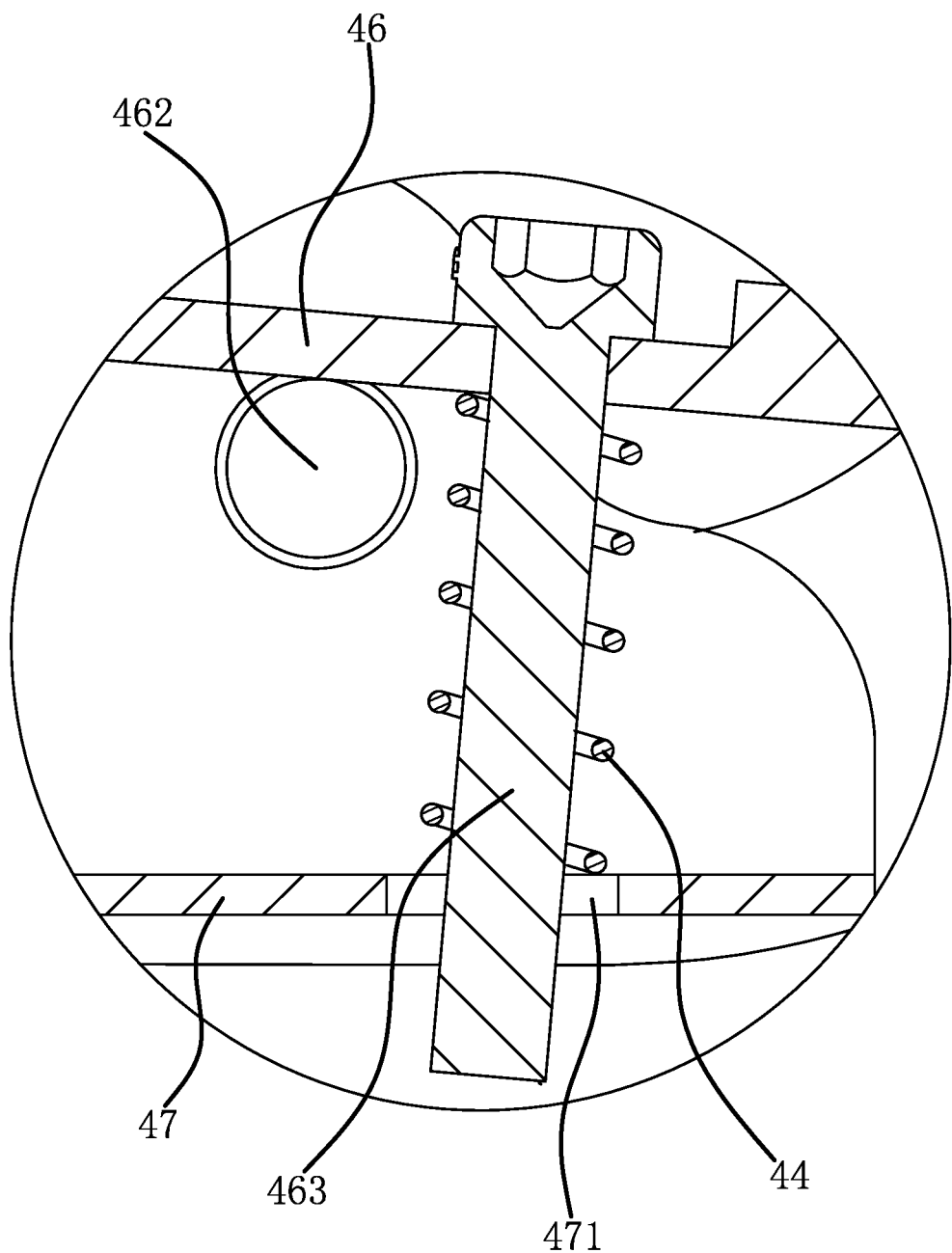
FIG. 8 is a sectional view of Section C in FIG. 7.

The structure of the multi-functional garden implement in preferred embodiment II is essentially the same as that in embodiment I. The differences are:

As shown in FIG. 6, FIG. 7, and FIG. 8, the locating mechanism (4) comprises a swinging rod (46). The swinging rod (46) is hinged to the underframe (1), and the front end of the swinging rod (46) is above the rotating bracket (2). A pedal (461) is fixedly connected to the rear end of the swinging rod (46). Multiple locating holes (22) are formed in the upper face of the rotating bracket (2). A locating pin (41) is vertically arranged on the lower face of the front end of the swinging rod (46). A locating spring (44) is arranged between the swinging rod (46) and the underframe (1), which can make the locating pin (41) be located in the locating hole (22) in an inserted mode. This structure adopts a pedaling mode. Namely, by treading on the pedal (461), the front end of the swinging rod (46) can tilt upward, and then the locating pin (41) detaches from the locating hole (22). However, by releasing the pedal (461) when the rotating bracket (2) rotates to the designed position, under the action of the locating spring (44), the front end of the swinging rod (46) swings downward and makes the locating pin (41) be inserted into the locating hole (22). The operation is convenient. Of course, in this structure, the diameter of the locating hole (22) shall be greater than the outer diameter of the locating pin (41), so that the locating pin (41) can be inserted into the locating hole (22) at a slant. A connecting seat (47) is fixedly connected to the underframe (1), and the swinging rod (46) is hinged to the connecting seat (47) through the shaft pin (462). A guiding column (463) is further fixedly connected to the swinging rod (46). A guiding hole (471) is formed in the connecting seat (47). Both of the guiding column (463) and the guiding hole (471) are located in the rear side of the shaft pin (462), and the guiding column (463) is slidably inserted into the guiding hole (471). The guiding column (463) is sleeved with the locating spring (44). One end of the locating spring (44) presses against the connecting seat (47) and the other end presses against the swinging rod (46). The swinging rod (46), the locating spring (44) and other parts are connected to the connecting seat (47), so a modular production is possible to achieve. Namely, the only thing to do is to install the assembled connecting seat (47) to the underframe (1), so the production process is simplified. Of course, since it is difficult to control the force when treading on the pedal (461), the connecting seat (47) can increase the overall connection strength, and improve the stability. Here, the guiding hole (471) is a long bar-shaped shaped hole, and the lengthwise direction is along the fore-and-aft direction of the underframe (1). The width of the guiding hole (471) is the same as the outer diameter of the guiding column (463), so the guiding column (463) can move smoothly in the guiding hole (471) when the swinging rod (46) swings. Also, the inner wall of the guiding hole also guides and limits the guiding column (463). This prevents the swinging rod (46) from swinging to left or right resulting the fact that the locating pin (41) is difficult to align with the locating hole (22).

The description of the preferred embodiments thereof serves only as an illustration of the spirit of the invention. It will be understood by those skilled in the art that various changes or supplements in form and details may be made therein without departing from the spirit and scope of the invention as defined by the appended claims.

Although the terms of underframe (1), supporting shaft (11), wheel (12), etc. are frequently used herein, it does not exclude the possibility to use any other terms. Using such terms is only to describe or explain the nature of the present invention more conveniently. The interpretation thereof as any additional restrictions is contrary to the spirit of the present invention.

LIST OF REFERENCE NUMERALS 1 underframe
2 rotating bracket
3 supporting plate
4 locating mechanism
5 limiting plate
6 bearing
11 supporting shaft
12 wheel
13 pushing handle
14 power source
15 working head
21 rotating shaft
22 locating hole
31 connecting part
32 supporting seat
41 locating pin
42 pulling rope
43 operating handle
44 locating spring
45 guiding sleeve
46 swinging rod
47 connecting seat
211 bolt
212 anchor nut
321 mounting hole
411 annular groove
451 annular protruding edge
461 pedal
462 shaft pin
463 guiding column
471 guiding hole

What is claimed is:

1. A multi-functional garden implement comprising:
   an underframe (1) connected with a supporting shaft (11);
   a pushing handle (13) fixedly connected to the underframe (1), the pushing handle (13) located at a rear end of the underframe (1);
   a supporting plate (3) fixedly connected with the underframe (1);
   a plurality of wheels (12) installed on the supporting shaft (11);
   a rotating bracket (2) connected to a power source (14);
   a working head (15) connected to the power source (14), the working head (15) located at a front end of the underframe (1), the rotating bracket (2) rotatably connected to the underframe (1) through a rotating shaft (21) and capable of driving the working head (15) to swing to two sides back and forth;
   a locating mechanism (4) between the underframe (1) and the rotating bracket (2), the locating mechanism (4) capable of securing the rotating bracket (2) onto the underframe (1); and
   a plurality of locating holes (22) formed in an upper face of the rotating bracket (2), the locating holes (22) arranged around the rotating shaft (21);
   wherein the locating mechanism (4) comprises a locating pin (41) and a swinging rod (46) hinged to the underframe (1), the locating pin (41) is vertically arranged on a lower face of a front end of the swinging rod (46) and the locating pin (41) is slidably connected to the supporting plate (3) in a vertical direction, and the locating pin (41) is capable of locating in each of the locating holes (22) in an inserted mode through a locating spring (44) arranged between the swinging rod (46) and the underframe (1).

2. The multi-functional garden implement as claimed in claim 1
   wherein the supporting shaft (11) is parallel to the supporting plate (3);
   wherein the rotating bracket (2) is plate-shaped; and
   wherein an axis line of the rotating shaft (21) is perpendicular to that of the supporting shaft (11).

3. The multi-functional garden implement as claimed in claim 2 wherein the rotating bracket (2) is parallel to the supporting plate (3); and
   wherein there is a clearance between a lower face of the rotating bracket (2) and an upper face of the supporting plate (3).

4. The multi-functional garden implement as claimed in claim 2 wherein the locating mechanism (4) comprises a pulling rope (42), and an operating handle (43);
   wherein an end of the locating pin (41) fixedly connected to a first end of the pulling rope (42);
   wherein the operating handle (43) is hinged to a free end of the pushing handle (13);
   wherein a second end of the pulling rope (42) is fixedly connected to the operating handle (43); and
   wherein when the operating handle (43) is gripped, the pulling rope (42) is pulled to detach the locating pin (41) from the locating hole (22).

5. The multi-functional garden implement as claimed in claim 4 wherein a rear edge of the supporting plate (3) is bended upward to form a connecting part (31);
   wherein a limiting plate (5) is fixedly connected to the connecting part (31);
   wherein a guiding sleeve (45) is vertically arranged on an upper face of the limiting plate (5);
   wherein the limiting plate (5) is above the supporting plate (3);
   wherein a lower face of the limiting plate (5) is parallel to an upper face of the supporting plate (3);
   wherein the rotating bracket (2) extends into a space between the limiting plate (5) and the supporting plate (3), an upper face of the rotating bracket (2) touches a lower face of the limiting plate (5); and
   wherein the locating pin (41) is slidably installed inside the guiding sleeve (45).

6. The multi-functional garden implement as claimed in claim 5 wherein an annular groove (411) is formed in an upper end face of the locating pin (41);
   wherein an inner circumferential wall of the guiding sleeve (45) is provided with an annular protruding edge (451) in a circumferential direction;
   wherein the pulling rope (42) is sleeved with the locating spring (44);
   wherein a first end of the locating spring (44) presses against an interior of the annular groove (411); and
   wherein a second end of the locating spring (44) presses against the annular protruding edge (451).

7. The multi-functional garden implement as claimed in claim 3
wherein a front end of the swinging rod (46) is above the rotating bracket (2);
wherein a pedal (461) is fixedly connected to a rear end of the swinging rod (46).

8. The multi-functional garden implement as claimed in claim 7 wherein a connecting seat (47) is fixedly connected to the underframe (1);
wherein the swinging rod (46) is hinged to the connecting seat (47) through a shaft pin (462);
wherein a guiding column (463) is fixedly connected to the swinging rod (46);
wherein a guiding hole (471) is formed in the connecting seat (47);
wherein both the guiding column (463) and the guiding hole (471) are located at a rear side of the shaft pin (462);
wherein the guiding column (463) is slidably inserted into the guiding hole (471);
wherein the guiding column (463) is sleeved with the locating spring (44); and
wherein a first end of the locating spring (44) presses against the connecting seat (47) and a second end presses against the swinging rod (46).

9. The multi-functional garden implement as claimed in claim 2 wherein a disk-shaped supporting seat (32) is fixedly connected to the supporting plate (3);
wherein a mounting hole (321) is formed in an upper face of the supporting seat (32);
wherein the rotating shaft (21) is fixedly connected to the rotating bracket (2), and a lower end of the rotating shaft (21) passes through the mounting hole (321); and
wherein a bearing (6) is further fixedly connected to an inside of the mounting hole (321).

10. The multi-functional garden implement as claimed in claim 9 wherein a lower end of the rotating shaft (21) is provided with a bolt (211);
wherein the bolt (211) extends out of the mounting hole (321) downward, and an anchor nut (212) is screwed onto an extending end of the bolt (211);
wherein the rotating shaft (21) is press fitted with an inner race of the bearing (6);
wherein the anchor nut (212) presses against the inner race of the bearing (6); and
wherein a lower face of the rotating bracket (2) presses against an upper end face of the bearing (6).

11. The multi-functional garden implement as claimed in claim 3 wherein the locating mechanism (4) comprises a locating pin (41), a pulling rope (42), and an operating handle (43);
wherein a plurality of locating holes (22) are formed in an upper face of the rotating bracket (2), the locating holes (22) arranged around the rotating shaft (21);
wherein the locating pin (41) is slidably connected to the supporting plate (3) in a vertical direction, an end of the locating pin (41) fixedly connected to a first end of the pulling rope (42);
wherein the operating handle (43) is hinged to a free end of the pushing handle (13);
wherein a second end of the pulling rope (42) is fixedly connected to the operating handle (43);
wherein a locating spring (44) is further formed in the supporting plate (3), which is capable of causing the locating pin (41) to be located in the locating hole (22) in an inserted mode; and
wherein when the operating handle (43) is gripped, the pulling rope (42) is pulled to detach the locating pin (41) from the locating hole (22).

12. The multi-functional garden implement as claimed in claim 11 wherein a rear edge of the supporting plate (3) is bended upward to form a connecting part (31);
wherein a limiting plate (5) is fixedly connected to the connecting part (31);
wherein a guiding sleeve (45) is vertically arranged on an upper face of the limiting plate (5);
wherein the limiting plate (5) is above the supporting plate (3);
wherein a lower face of the limiting plate (5) is parallel to an upper face of the supporting plate (3);
wherein the rotating bracket (2) extends into a space between the limiting plate (5) and the supporting plate (3), an upper face of the rotating bracket (2) touches a lower face of the limiting plate (5); and
wherein the locating pin (41) is slidably installed inside the guiding sleeve (45).

13. The multi-functional garden implement as claimed in claim 3 wherein a disk-shaped supporting seat (32) is fixedly connected to the supporting plate (3);
wherein a mounting hole (321) is formed in an upper face of the supporting seat (32);
wherein the rotating shaft (21) is fixedly connected to the rotating bracket (2), and a lower end of the rotating shaft (21) passes through the mounting hole (321); and
wherein a bearing (6) is further fixedly connected to an inside of the mounting hole (321).

* * * * *